JOSEPH H. DEACON, OF LUMBERTON, NEW JERSEY.

Letters Patent No. 86,283, dated January 26, 1869.

IMPROVED JELLY FROM THE RHUBARB-PLANT.

The Schedule referred to in these Letters Patent and making part of the same.

*To all whom it may concern:*

Be it known that I, JOSEPH H. DEACON, of Lumberton, in the county of Burlington, and State of New Jersey, have invented a new and useful Jelly, extracted from the Rhubarb-Plant; and I do hereby declare that the following is a full, clear, and exact description thereof.

I take the stalks of the rhubarb-plant, and wash and clean them nicely. I then put the stalks, so prepared, into a little water, and heat it slowly to a simmer. I then express all the water and juice together, add about one pound of white sugar to each pint of juice, and boil it in a preserve-kettle till it is of the proper consistency, which will, as a general rule, require from fifteen to twenty minutes.

I thus make a superior jelly, delicious to the palate, and healthful in its effects upon the human system.

The jelly may be put up in glasses, cups, or jars, as fruit-jellies are usually put up, and will keep indefinitely.

I claim, as a new article of manufacture, jellies extracted from the rhubarb-plant, substantially as set forth.

JOS. H. DEACON.

Witnesses:
    Jos. L. COOMBS,
    J. J. COOMBS.